June 22, 1965 J. H. FABRICIUS 3,189,974
PROCESS FOR CAPACITOR
Filed April 12, 1962
2 Sheets-Sheet 2
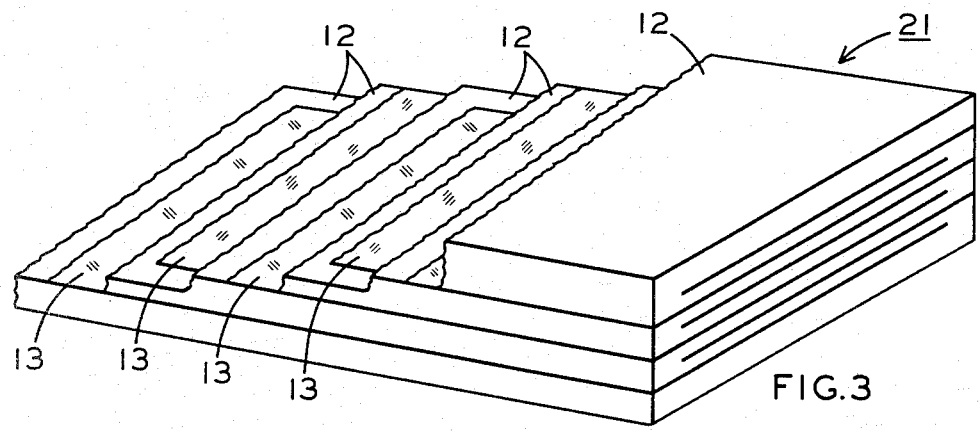
FIG.3
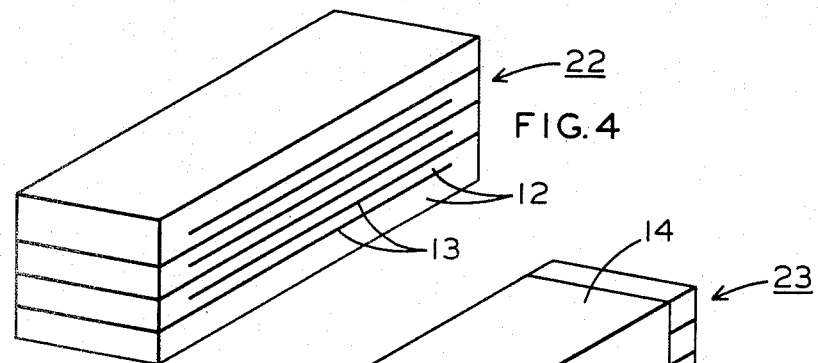
FIG.4
FIG.5
FIG.6
INVENTOR.
JOHN H. FABRICIUS
BY Connolly and Hutz
HIS ATTORNEYS

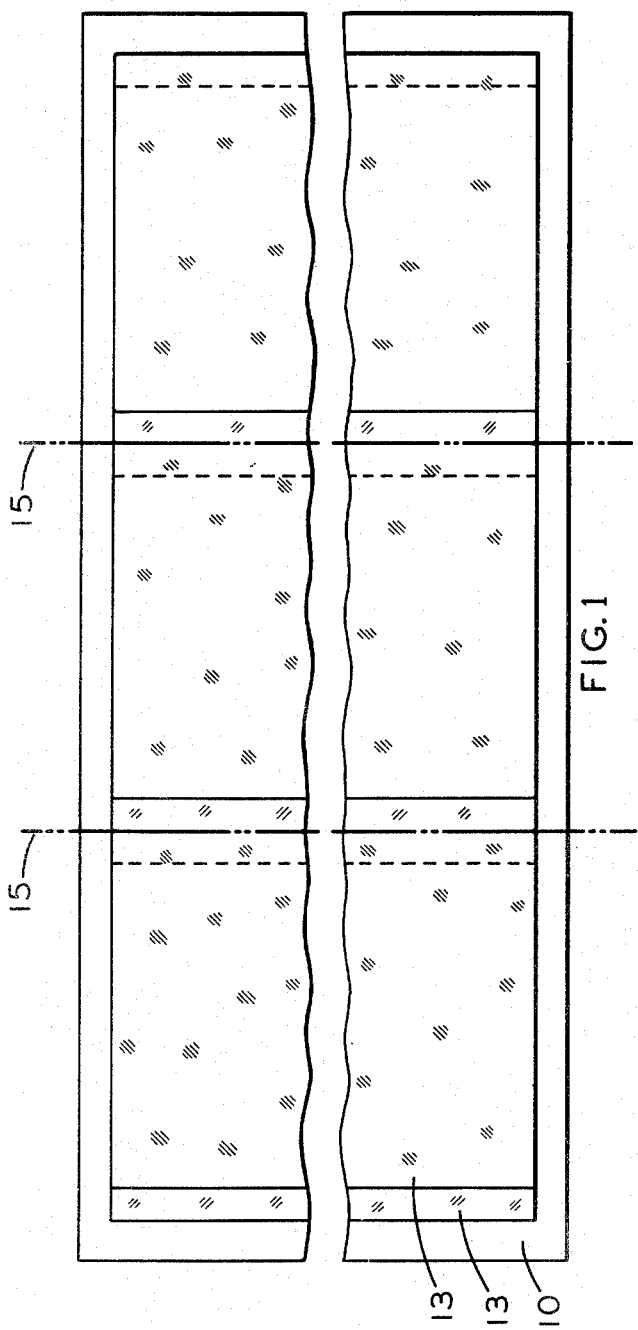
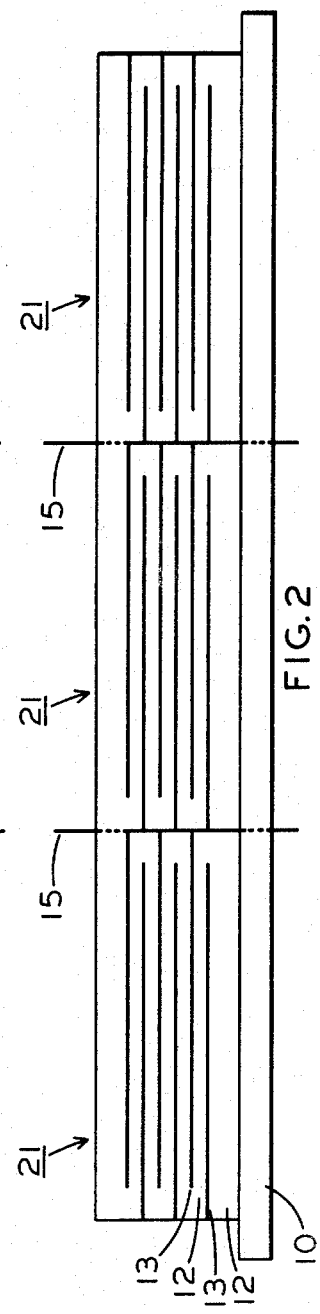

United States Patent Office

3,189,974
Patented June 22, 1965

3,189,974
PROCESS FOR CAPACITOR
John H. Fabricius, Stamford, Vt., assignor to Sprague
Electric Company, North Adams, Mass., a corporation
of Massachusetts
Filed Apr. 12, 1962, Ser. No. 186,914
6 Claims. (Cl. 29—25.42)

This invention relates to the manufacture of capacitors and more particularly to the manufacture of monolithic chip capacitors.

In the prior art there is described a process wherein the alternate layer structure of electrical capacitors is built up in a block consisting of as many as 50–100 or more individual capacitors. In forming the block a rigid base material is uniformly covered with a vitreous enamel composition. Over this layer is applied a number of individual powdered silver areas. A second vitreous enamel layer is applied over the silver areas and the spaces therebetween. A second series of individual silver areas is applied to the second vitreous enamel layer. These silver areas are so positioned as to overlap and cover, at least throughout one dimension, the spaces between the first set of electrodes. A third layer of vitreous enamel is then applied over the second set of electrodes and the spaces therebetween. This process is continued until the desired number of dielectric and electrode layers are built up. The block is then cut horizontally and vertically into individual units; silver paint is applied to the ends of the units and the units are fired to form monolithic capacitors.

Processes of this type find their greatest utility in the manufacture of comparatively large size capacitors. It is in the manufacture of comparatively small capacitors that these processes do not live up to expectations. Because of limited process tolerances, a large leeway must be given in positioning the staggered electrodes and in cutting the blocks into individual units. As a result of this leeway, a large border area of dielectric has to be tolerated. It is common to find in the smaller capacitors a dielectric border in the order of 40 mils or more in units where only 2½ to 5 mils are needed. Any process which overcomes this shortcoming would amount to a significant advance in the art.

It is an object of the instant invention to overcome the foregoing and related disadvantages.

It is another object of this invention to form a large number of individual capacitors more economically than similar prior art processes.

It is yet another object to form monolithic capacitors utilizing a minimum of dielectric.

Still other objects of this invention will become apparent when read in conjunction with the appended claims and accompanying drawings, in which:

FIGURE 1 is a plan view of adjacent electrodes without a dielectric.

FIGURE 2 is an end view of a build-up of alternate layers of dielectric and staggered electrodes.

FIGURE 3 is a perspective view, partly broken, of a segment of the build-up of FIGURE 2.

FIGURE 4 is a perspective view of a capacitor chip cut from the segment of FIGURE 3.

FIGURE 5 is a perspective view of the capacitor chip of FIGURE 4 with a dielectric coating over the cooperating electrodes.

FIGURE 6 is a perspective view of the completed monolithic capacitor with leads attached.

The size of the figures is exaggerated to better show the component parts and their relationship to one another.

In general, the above objects are achieved by placing spaced electrode strips on a dielectric layer; covering the electrode strips and the spaces therebetween with a second dielectric layer; applying to said second dielectric layer a plurality of suitably spaced long, narrow metal electrode strips, these strips being coextensive lengthwise with the first strips and offset width-wise to a distance corresponding to the distance between said first strip; this build-up is continued until the desired number of electrode strips and dielectric layers are obtained; the build-up is then cut into long narrow segments along lines corresponding with the outside edges of the electrode strips, these segments are then diced or cut widthwise to form a plurality of chips or units; the central portions of these units are coated with a dielectric material to cover the electrode edges exposed by said dicing or cutting; the units are then fired forming monolithic capacitors. Electrical communication between alternate electrodes is accomplished by means of a conductive material, e.g. silver paint.

Referring now to the drawing, which illustrates but one embodiment of the instant invention, there is shown in FIGURES 1 and 2 the manner in which the layers are built-up. Upon a temporary base 10 there is applied a continuous layer 12 of a dielectric slip. Upon this layer is applied a plurality of long, narrow strips of metal electrodes 13, suitably spaced. Over these electrodes and the spaces therebetween there is applied a second continuous layer 12 of a dielectric slip. The build-up is continued in this fashion until the desired number of layers are obtained. It will be noted that each layer of electrode strips is offset somewhat with reference to adjacent layers of electrode strips. Thereafter, the build-up is cut along the lines shown at 15 in FIGURES 1 and 2, to form the individual segments 21, illustrated in FIGURE 3. These segments are then cut or diced to form individual capacitor chips 22 as illustrated in FIGURE 4. These individual units or chips are then coated with a dielectric material over the central portion thereof to cover the edges of the cooperating electrodes exposed by said cutting or dicing as shown at 14 in FIGURE 5. The units or chips are then fired to maturity. Thereafter the electrode ends of the individual capacitor units are exposed by grinding or abrading to remove any ceramic or oxide covering said electrodes. To both ends there is then applied an electrode pick-up 16 to afford electrical communication between the electrodes and to which are affixed leads 17 to complete the capacitor 24 shown in FIGURE 6.

In a modification of the foregoing embodiment, the same general process is followed except that double instead of single width electrode strips are applied to the continuous ceramic layers. The electrode strips are so positioned that the longitudinal center line of each electrode strip is in a vertical plane with the spaces between the strips of the adjacent electrode layers. When the build-up is completed it is cut into segments along lines corresponding with the longitudinal center line of each electrode strip. These segments are then cut or diced as in the foregoing embodiment.

An important feature of the invention resides in the fact that the cooperating electrodes in the build-up are displaced from each other in a transverse direction but continuous in a longitudinal direction. This eliminates indexing and registration of the electrode patterns in a longitudinal direction. When the narrow chips are then cut from the build-up the edges of opposing electrodes are exposed and they are separated only by the thickness of the dielectric. It is in this area that prior art processes have, because of limited process tolerances, provided a dielectric margin much greater than is actually needed. The instant process makes it possible to seal off these edges with no more than the required amount of dielectric. This can be accomplished either by spraying the central portion of the chip or dipping the chips in the same or similar dielectric slip used in forming the build-up. If the dipping process is employed to cover the exposed edges in the central area of the chip, one end of the chip will also be covered with the dielectric material. This end-covering must be removed after firing the chip so that the electrode ends will be exposed. Even if the spraying technique is used the end area of the chips should be ground or abraded to insure exposure of the electrodes.

The instant invention can also be practiced by a process wherein one or many individual continuous strips of ceramic material and metal electrodes are built-up. For example, at least one continuous narrow strip of dielectric slip is applied to a moving carrier and directed through driers. To all but one marginal edge of the dried surface is applied a coating of powdered electrode metal dispersed in a liquid vehicle. The metal coated dielectric is directed through driers and a second layer of dielectric slip is applied over the electrode metal and the marginal dielectric edge. This layered material is directed through driers and a second coating of electrode metal is applied, having a margin of dielectric on the side of the strip opposite the first margin. This cycle of building up alternate layers of dielectric and electrode metal is continued until the desired number of layers are formed. Thereafer the process is completed as in the embodiments disclosed supra.

The following is a specific example illustrating one embodiment of the instant invention.

*Example*

A continuous surface approximately 6 inches x 6 inches x 6 mils of barium titanate slip is applied to a temporary base. To the dried surface thereof, there is applied 29 strips of powdered palladium approximately 6 inches x 155 mils x 0.2 mil, said strips being spaced approximately 55 mils apart. The powdered palladium is applied with the aid of a volatile carrier liquid. Over these strips and the spaces therebetween, there is applied a second continuous layer of ceramic slip, said layer being approximately 6 inches x 6 inches x 3 mils. To the dried surface thereof, there is applied 29 strips of powdered palladium of dimensions equal to the first strips, said strips being coextensive length-wise but offset 55 mils width-wise with respect to said first strips. This process is continued until seven series of electrode strips and eight surfaces of barium-titanate slip are built-up, the last layer of barium-titanate slip being 6 mils thick. The layers are then cut along lines corresponding to the outside edges of the electrodes to yield long, narrow segments wherein the cooperating electrodes are offset width-wise from each other but continuous in a longitudinal direction. These segments are cut transversely to form individual units that have a thickness of approximately 48 mils. Thereafter, a coating of barium-titanate slip approximately 2½ mils thick is built-up about the central area of each unit to cover the edges of the electrodes exposed by said last cutting. This coating is accomplished by dipping the units in the same ceramic slip used in forming the build-up. The individual units are then fired to maturity at a temperature between 2400–2600° F. The capacitor ends are then ground to expose the internal electrodes and an electrode pick-up of silver is applied to the electrodes and leads are soldered thereto.

The manner in which the dielectric slip and metal electrodes are applied is not critical. Any convenient way known to the art can be employed. For example, the layers may be sprayed, or forced through a stencil by means of a squeegee or other similar implement i.e. the so-called silk screen squeegee mode of application.

In a modification of the foregoing example, the long narrow segments may first be fired and then subdivided into chips, for example, by sawing. This eliminates the possibility of smearing and distortion which exists when the cutting or dicing is performed on the unfired segment.

After the chips are formed, the electrodes exposed by the cutting need not be coated with the same or similar dielectric material which separates the electrodes. Instead, glass frit may be applied to the central portion of the fired chip and then the unit fired to fuse the glass frit. Alternatively the leads may be first attached to the fired chip and then the glass coating applied over the central portion and over the lead connections. The lead connections may be either the conventional soldered connection or it may be fashioned by means of an end cap. When using end caps the ends of the chip are ground to a shape conforming to the end cap and the latter, with leads attached, are affixed to the electrodes, for example, by soldering.

It should be apparent that the number and dimensions of the individual layers are in no way limited except by practical considerations. The thickness of the capacitor chips cut from the build-up is likewise not limited. For example, the chips may be any thickness down to 20 mils or less. The physical size and capacitance desired in each unit will dictate the dimensions of the layers and the thickness of the chips.

The dielectric material contemplated can be any of the commonly used titanates, for example, the alkaline earth metal titanates, either pure or with the alkaline earth metal or the titanium partly replaced by other metals. Representative of this class is barium titanate. Dielectric vitreous enamel may also be used.

The electrode metals contemplated herein are silver and the group known as the platinum metals or the triads which include ruthenium, rhodium, palladium; and osmium, iridium and platinum. These metals are conveniently employed in a finely divided state dispersed in a volatile liquid vehicle. Some of the metals may, however, be employed in the form of a thin foil. The preferred metals are palladium and platinum when a ceramic dielectric is employed and silver when a vitreous enamel dielectric is used.

The completed capacitor units may be coated with any resin material, for example the phenolics, for electrical insulation of the metallic parts or for mechanical uniformity.

As many apparently widely different embodiments of this invention may be made without departing from the spirit and scope thereof, it is to be understood that the invention is not limited to the specific embodiments hereof except as defined in the appended claims.

What is claimed is:

1. A process for forming capacitors comprising building up a plurality of alternate layers of dielectric material and metal electrodes, said layers being built-up as follows: forming a continuous surface of dielectric material; applying to said surface a plurality of suitably spaced long, narrow metal electrode strips; applying to the top of said strips a second continuous surface of dielectric material; applying to said second dielectric layer a plurality of suitably spaced long, narrow metal electrode strips, these strips being coextensive length-wise width the first strips and offset width-wise to a distance corresponding to the distance between said first strips; continuing said process, applying alternate layers of dielectric material and metal electrode strips until the desired number of layers have been built-up; thereafter forming said layers into long, narrow segments by cutting along lines corresponding with the outside length edges of the cooperating electrodes; converting said segments into a plurality of individual units by cutting across the width thereof; applying a coating of dielectric material about the individual units to cover the metal edges exposed by said last cutting; thereafter firing the individual units to maturity followed by exposing the electrode ends of said units and attaching leads thereto.

2. A process for forming capacitors comprising building up a plurality of alternate layers of dielectric material and metal electrodes, said layers being built-up as follows: forming a continuous surface of a dielectric slip, said dielectric being selected from the group consisting of a ceramic dielectric and a vitreous enamel dielectric; applying to the dried surface thereof a plurality of spaced, long narrow strips of powdered metal suspended in a volatile carrier vehicle, said metal being selected from the group consisting of the platinum metals and silver; applying over the dried strips a second continuous layer of said dielectric slip; applying to the dried second layer a plurality of spaced, long, narrow strips of said powdered metal suspended in a volatile vehicle, these strips being coextensive length-wise with the first strips and offset width-wise to a distance corresponding to the distance between said first strips; continuing said process, applying alternate layers of dielectric material and strips of powdered metal until the desired number of layers have been built-up; thereafter forming said layers into long, narrow segments by cutting along lines corresponding with the outside length edges of the cooperating electrodes; converting said segments into a plurality of individual units by cutting across the width thereof; applying a coating of dielectric material about the individual units to cover the metal edges exposed by said last cutting; thereafter firing the individual units to maturity followed by exposing the electrode ends of said units and attaching leads thereto.

3. A process for forming capacitors comprising building up a plurality of alternate layers of dielectric material and metal electrodes, said layers being built-up as follows: forming a first continuous surface of a dielectric slip; applying to said surface a plurality of long, narrow metal electrode strips suitably spaced, the width of said strips being twice that desired in the finished capacitors; applying over said strips a second continuous surface of dielectric material; applying to said second dielectric surface a plurality of metal electrode strips of dimensions equal to said first strips, these second strips being so positioned that the longitudinal center line thereof is in a vertical plane with the spaces between said first mentioned strips; continuing said process, applying alternate layers of dielectric material and metal electrode strips until the desired number of layers have been built-up; thereafter forming said layers into long, narrow segments by cutting along the longitudinal center line of each metal strip; converting said segments into a plurality of units by cutting across the width thereof; applying a coating of dielectric material about the individual units to cover the metal edges exposed by said last cutting, thereafter, firing the individual units to maturity followed by exposing the electrode ends of said units and attaching leads thereto.

4. A continuous process for forming dielectric capacitors comprising building up a plurality of alternate layers of dielectric material and metal electrodes, said layers being built up as follows: applying at least one continuous, narrow strip of dielectric slip to a moving carrier, directing the slip via the carrier through driers; applying to all but one marginal edge of the dried slip a coating of powdered electrode metal dispersed in a liquid vehicle; directing the metal coated dielectric through driers; applying a second layer of dielectric slip over the electrode metal and the marginal dielectric edge; directing this layered material through driers; applying a second coating of electrode metal to this dielectric coating leaving a margin on the side of the strip opposite to the first margin; continuing this cycle of building up alternate layers of dielectric and electrode metal until the desired number of layers are formed; thereafter directing the layered material via the moving carrier past a cutting mechanism which performs successive cuts across the width of said layers forming a plurality of individual capacitor units; applying a coating of dielectric material about the individual units to cover the electrode edges exposed by said cuts; directing said units through a firing apparatus to form monolithic capacitor units; thereafter exposing the electrode ends and attaching leads thereto.

5. A process for forming ceramic capacitors comprising building up alternate layers of a barium titanate and metal electrodes, said layers being built up as follows: forming a surface of a barium titanate slip approximately 6 inches on a side and 6 mils thick; applying to the dried surface thereof about 29 strips of a powdered metal selected from the group consisting of platinum and palladium dispersed in a volatile carrier liquid, said strips being approximately 6 inches long, 155 mils wide, 0.2 mil thick and spaced approximately 55 mils apart; applying over the dried strips a second surface of barium titanate slip approximately 6 inches on a side and 3 mils thick; applying to the dried surface thereof a second series of powdered metal strips equal in number and size to the first series, said second strips being coextensive length-wise but offset 55 mils width-wise with respect to said first series; continuing this process until 7 series of electrode strips and 8 surfaces of barium titanate are built up, the last layer of barium titanate being 6 mils thick; the layers are then cut along lines corresponding to the outside edges of the electrodes; cutting these segments transversely to form individual units having a thickness of approximately 48 mils; a coating of barium titanate slip approximately 2½ mils thick is built up about the central area of each unit to cover the edges of the electrodes exposed by said last cutting; the individual units are then fired to maturity at a temperature between about 2400 and 2600° F.; thereafter the capacitor ends are ground to expose the internal electrodes; an electrode pick-up of silver is applied to the electrodes and leads attached thereto.

6. A process for forming ceramic capacitors from an elongated strip having a build-up of a plurality of alternate layers of dielectric material and cooperating, alternately disposed metal electrodes, said process comprising converting said build up into a plurality of units by cutting across the width thereof; applying a coating of dielectric material about the individual units to cover the electrode edges exposed by said cutting; thereafter firing the individual units to maturity; exposing the electrode ends and attaching leads thereto.

References Cited by the Examiner
UNITED STATES PATENTS

| | | | |
|---|---|---|---|
| 2,395,442 | 2/46 | Ballard | 29—25.42 |
| 2,531,389 | 11/50 | Brandt | 29—25.42 |
| 3,021,589 | 2/62 | Weller | 29—25.42 |

RICHARD H. EANES, JR., *Primary Examiner.*